United States Patent
Storz

[11] 3,791,379
[45] Feb. 12, 1974

[54] VALVE FOR ENDOSCOPES

[76] Inventor: Karl Storz, Hermannstrasse 14, Tuttlingen, Germany

[22] Filed: Sept. 2, 1971

[21] Appl. No.: 177,350

[30] Foreign Application Priority Data
Mar. 2, 1971 Germany .................. G 71 07 645.4

[52] U.S. Cl. ............ 128/4, 128/303.15, 137/625.24, 137/625.47
[51] Int. Cl. ... A61b 1/12, A61b 17/32, F16k 11/02
[58] Field of Search ...... 137/625.24, 625.47; 128/4, 128/6, 7, 303.15

[56] References Cited
UNITED STATES PATENTS

| 715,623 | 12/1902 | Stretch et al. ................. 251/310 X |
|---|---|---|
| 844,332 | 2/1907 | Demacakos ..................... 251/310 X |
| 1,643,732 | 9/1927 | Wolf ...................................... 128/7 |
| 1,710,540 | 4/1929 | Hollander .................. 137/625.24 X |
| 2,806,217 | 9/1957 | Schmatz ..................... 137/625.24 X |
| 1,767,025 | 6/1930 | Wappler ............................... 128/7 |

*Primary Examiner*—Channing L. Pace
*Attorney, Agent, or Firm*—Murray Schaffer

[57] ABSTRACT

Endoscopes having a shaft and a head at the proximal end. The head has ducts connected to a source and drain of fluid for irrigating the body and a valve member located in the head rotatable between a first position permitting entry of the fluid and a second position allowing removal of the fluid.

5 Claims, 4 Drawing Figures

PATENTED FEB 12 1974　　　　　　　　　　　3,791,379

INVENTOR.
KARL STORZ
BY Murry Schaffer
Atty

VALVE FOR ENDOSCOPES

BACKGROUND OF INVENTION

The present invention relates to the construction of endoscopes and in particular to cystoscopes or the like by which an irrigation fluid is supplied to the body.

Generally, the insertable hollow shaft of the endoscope is connected to a source of fluid and for its removal (such as pump) by two ducts or hoses by which fluid is supplied and discharged under predetermined pressure, temperature and medicinal conditions. In the known devices of this nature separate manually operable valves are provided by which the inlet and outlet of the fluid from the endoscope may be independently regulated. The size of the supply duct is not required to be great since it passes clear liquid. The outlet duct, on the other hand, is often insufficient if made the same size as the supply duct, since it is required to carry tissue particles and stone fragments with the effluent. An enlargement of either passage necessitates a corresponding enlargement of the valves necessary for the regulation of fluid flow and consequently an increase in the weight of the device and a concomittant loss in the ease and facility by which it may be handled.

An attempt has been made to replace the two valves with a two-way valve directly on the proximal end of the endoscope. This results in a weight reduction, however, the problem of having an inlet too large and an outlet too narrow remains the same. In another attempt, the two-way valve was remotely connected by a flexible hose to the proximal end of the endoscope. Thus the discharge tube could be made as large as required. However, here the handiness of the device was impaired since one hand had to be removed from the endoscope to operate the remote valve. This was a severe problem since the flexible hose connection allowed the valve to move and the doctor had to hunt for it during the operation.

It is the object of the present invention to provide an endoscope adaptable for irrigating the body, overcoming the drawbacks and disadvantages of the prior art.

It is another object of the present invention to provide an endoscope such as a cystoscope which is light in weight, compact and easily manually operable.

It is another object to provide a cystoscope for irrigating the bladder which is easier and simpler to operate than those previously known and also which provides an outlet duct for the discharge of the fluid larger than the inlet duct.

These objects and others will be apparent from the following disclosure of the present invention.

SUMMARY OF INVENTION

According to the present invention, an endoscope, particularly adaptable as an irrigating cystoscope and the like, is provided comprising a tubular shaft having a head at the proximal end in which an inlet and outlet duct are radially arranged. A valve member is located within the head having a pair of passages alignable respectively with one of the inlet and outlet ducts. The head and valve member cooperate to form a rotatable valve movable between a first position wherein one duct and passage are aligned and a second position wherein the other duct and passage are aligned. Preferably the duct and passage corresponding to the outlet or discharge of the endoscope is larger in cross-section than the other so that particulate matter may be easily carried out.

A second valve is also located in the inlet duct so that the supply of fluid may be more easily and more precisely regulated.

Full details of the present invention are set forth in the following description wherein reference is made to the accompanying drawing.

DESCRIPTION OF THE INVENTION

For additional details of endoscopes, their structure and use, reference can be made to the copending applications of the inventor, Ser. No. 177,353 and Ser. No. 177,349 filed on even date herewith corresponding to German applications G 71 18059.1 filed May 8, 1971 and G 71 12995.8 filed Apr. 3, 1971.

Figure 1:
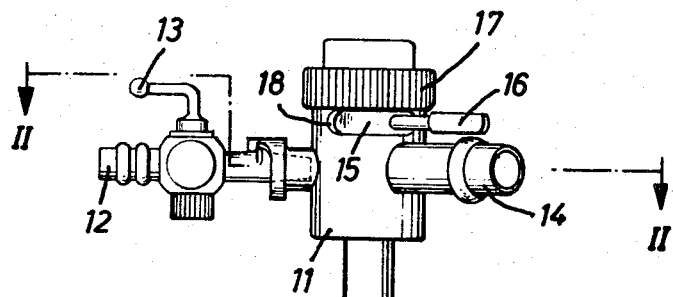
FIG. 1 is a side elevational view of a cystoscope embodying the present invention.
Figure 4:
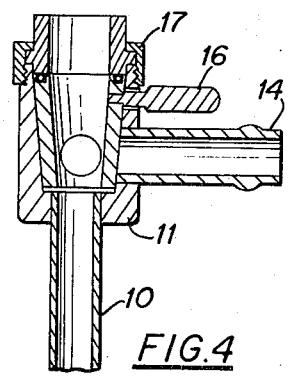
FIG. 4 is a sectional view along the longitudinal axis showing the interior of the valve.
Figure 2:
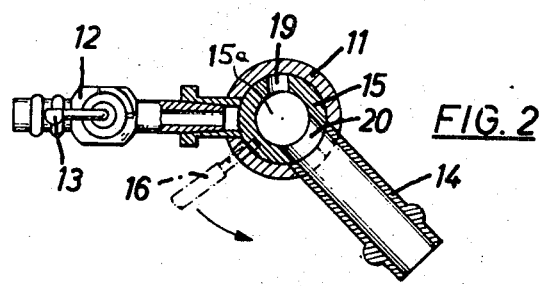
FIGS. 2 and 3 are sectional views taken along line II — II of FIG. 1 showing the different positions of the valve.
Figure 3:
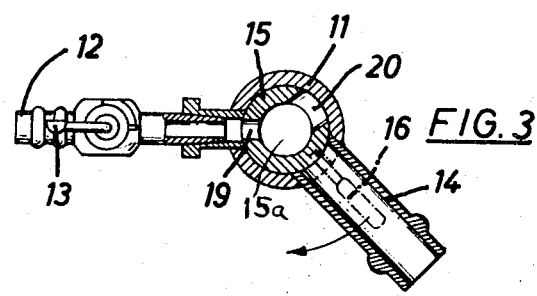

Turning to FIG. 1 there is seen a cystoscope insert comprising a tubular hollow shaft 10 adapted to be inserted within the patient's body through a sheath or tubular sleeve previously or simultaneously inserted in place. A hollow head 11 is fixed on the proximal end of the shaft 10. An eyepiece 2 is mounted at the proximal end of a hollow rod 3 which extends freely through the head 11 into the shaft 10. The rod 3 carrier an electrode 5 and a shield 6. The rod 3 is reciprocable by a fingerlever mechanism 4 into and out of the situs of the operation. A main inlet duct 12 having a manually operable valve 13 is set into a bayonet socket 12a radially extending from the head 11 so as to be readily removable therefrom. A second or outlet duct 14, having a cross-section greater than that of the inlet tube 12, is set into the head 11 at a radially offset position from that of duct 12. The outer ends of ducts 12 and 14 are provided with annular retaining rings or other means by which the ends of suitable supply and discharge hoses can be connected. The interior of the ducts 12 and 14 communicate with the interior of the head 11. The supply and discharge hoses are connected to suitable sources and drains of rinsing water, medicated liquid, etc. in the known manner.

A rotary valve member such as a spool 15 having a hollow axial bore 15a is inserted within the head 11 to alternate the flow of liquid within the cystoscope between the inlet duct 12 and the outlet duct 14. The axial bore 15a permits the direct ligth transmission from the situs of the operation to the eyepiece, movement of rod 3, and serves as the conduit connecting the hollow shaft 10 and each of the radial ducts 12 and 14 for fluid flow. The interior of the head 11 and the outer configuration of the spool 15 are of conforming conical sections symetrical about the longitudinal axis of the device, about which it is rotatable, and having their apices pointing downwardly toward the distal end. The rotary valve spool 15 is retained within the head 11 by a threaded cap 17 closing the head. Suitable retaining rings or washers (not shown) are used to firmly seat and prevent the rotary valve member from vibrating within the head.

The head 11 is provided with a transverse slot 18 through which a lever 16 connected to the rotary spool 15 extends. The spool 15 is provided with a pair of radially extending passages 19 and 20 extending from the central bore 15a on a level along the longitudinal axis equal to that of the inlet and outlet ducts 12a and 14. The passages 19 and 20, however, are angularly spaced from each other a distance different from that of the angular distance between the inlet and outlet ducts 12a and 14 so that communication between these ducts and the interior of the valve member 15 cannot be simultaneously effected. However, by turning the rotary member 15 via lever 16, passage 19 can be made to align with duct 12a and passage 20 to align with duct 14. The lever 16 is located with respect to the passages 19 and 20, and the slot 18 is dimensioned so that the extreme angular displacement of the lever 16 in the slot 18 will align either passage 19 or passage 20 with their respective ducts 12a and 14. The passage 20 has a larger cross-section than that of the passage 19, each conforming substantially to the dimensions of the outlet and inlet tubes 14 and 12 respectively.

It will be appreciated that valve 13 may be employed in its usual manner to regulate the volume of fluid fed to the device and its rate of entry. The valve comprising the spool 15 and head 11 may be used independently to alternate, as desired, between a feeding mode and a discharge mode without the necessity of shutting the valve 13. This may be accomplished manually and directly while holding the device with one hand. Further, the discharge or outlet duct may be made as large as necessary to pass any size particle while the inlet valve regulates the flow of the fluid; this is made possible by transferring the valve function directly to the head of the device. The extending lever makes manual access simple and easy.

It will be appreciated that various modifications and changes are possible. Accordingly, the present disclosure should be taken as being illustrative only and not limiting of the present invention.

What is claimed:

1. An endoscope for treating and irrigating the body comprising a tubular shaft having a hollow head axially aligned with said shaft at the proximal end, and an electrode mounted within said shaft and movable axially in respect to said head and shaft, an inlet duct and an outlet duct radially entering said head for passing fluid into and out of said shaft, a valve member located within said head comprising a rotatable spool having an axial bore aligned with said shaft and head, a pair of radial passages formed in said spool, and means extending radially through said head for rotating said spool about the central axis of said head, said spool and said head cooperating to form a rotatable valve movable between a first position wherein one of said passages is aligned with said inlet duct and a second position wherein the other of said passages is aligned with said outlet duct.

2. The endoscope according to claim 1 wherein said outlet duct is larger than said inlet duct and said passages in said valve member correspond respectively with the inlet and outlet ducts with which they align.

3. The endoscope according to claim 1 including a second valve located within the inlet duct for regulating the supply of liquid to said first mentioned valve.

4. The endoscope according to claim 1 wherein said head has a conical interior, and said valve member comprises a spool having a conical outer surface conforming thereto and an axial passage therein communicating with said shaft and each of said radial passages.

5. The endoscope according to claim 4 wherein said head is provided with a transverse slot and said spool is provided with a lever extending radially through said slot whereby said spool may be rotated.

* * * * *